(12) United States Patent
Wang

(10) Patent No.: US 12,109,085 B2
(45) Date of Patent: Oct. 8, 2024

(54) INVERSION MAINTENANCE DEVICE FOR DENTAL HANDPIECES

(71) Applicant: MICROP TECHNOLOGY (TAIWAN), INC., Chiayi (TW)

(72) Inventor: Shih-Chun Wang, Chiayi (TW)

(73) Assignee: MICROP TECHNOLOGY (TAIWAN), INC., Chiayi (TW)

( * ) Notice: Subject to any disclaimer, the term of this patent is extended or adjusted under 35 U.S.C. 154(b) by 459 days.

(21) Appl. No.: 17/700,756

(22) Filed: Mar. 22, 2022

(65) Prior Publication Data

US 2022/0313410 A1  Oct. 6, 2022

(30) Foreign Application Priority Data

Mar. 30, 2021  (TW) ................... 110111631

(51) Int. Cl.
| | | |
|---|---|---|
| *A61C 19/00* | (2006.01) | |
| *A61C 3/02* | (2006.01) | |
| *B08B 3/10* | (2006.01) | |
| *B08B 5/02* | (2006.01) | |

(52) U.S. Cl.
CPC .............. *A61C 19/002* (2013.01); *A61C 3/02* (2013.01); *B08B 3/10* (2013.01); *B08B 5/02* (2013.01); *B08B 2203/02* (2013.01)

(58) Field of Classification Search
CPC ......... B08B 5/02; B08B 3/10; B08B 2203/02; A61C 3/02; A61C 19/002
See application file for complete search history.

(56) References Cited

U.S. PATENT DOCUMENTS

| | | | | | |
|---|---|---|---|---|---|
| 3,625,231 | A | * | 12/1971 | Littrell, Jr. ........... | A61C 1/0007 134/102.1 |
| 4,752,444 | A | * | 6/1988 | Bowen ................. | A61C 19/002 422/292 |
| 5,057,283 | A | * | 10/1991 | Guggenheim ....... | A61C 19/002 422/295 |
| 5,197,499 | A | * | 3/1993 | Bodenmiller ............. | A61L 2/04 134/186 |

(Continued)

FOREIGN PATENT DOCUMENTS

| | | |
|---|---|---|
| CN | 109223202 A | 1/2019 |
| CN | 210077895 U | 2/2020 |

(Continued)

*Primary Examiner* — Benjamin L Osterhout
(74) *Attorney, Agent, or Firm* — RABIN & BERDO, P.C.

(57) ABSTRACT

An inversion maintenance device has a case, an inverting mechanism, and a control system. The case forms an inversion space. The inverting mechanism has an inverting base and multiple adapting modules. The inverting base is pivotally mounted in the inversion space. The adapting modules are mounted on the inverting base. Each of the adapting modules has an adapting port. The inverting base is capable of inverting to make the adapting port face downward and cover the inversion space. Dental handpieces can be mounted on the adapting modules. The control system has a control module and an operation input terminal. The operation input terminal is electrically connected to the control module and is capable of controlling the control module to inject a working fluid with pressure into the dental handpiece via the adapting module.

20 Claims, 15 Drawing Sheets

(56) References Cited

U.S. PATENT DOCUMENTS

| | | | | |
|---|---|---|---|---|
| 5,282,745 A * | 2/1994 | Wiltrout | A61C 19/002 |
| | | | 433/132 |
| 5,380,369 A * | 1/1995 | Steinhauser | A61C 19/002 |
| | | | 134/1 |
| 5,571,488 A * | 11/1996 | Beerstecher | A61L 2/24 |
| | | | 134/94.1 |
| 6,368,556 B1 * | 4/2002 | Morgenstjerne | A61C 19/002 |
| | | | 422/26 |
| 9,962,456 B2 * | 5/2018 | Heckenberger | A61L 2/24 |
| 2002/0068029 A1 * | 6/2002 | Johansen | A61C 19/002 |
| | | | 422/301 |
| 2006/0104875 A1 | 5/2006 | Lund-Jensen et al. |
| 2006/0196728 A1 * | 9/2006 | Numakawa | A61C 19/002 |
| | | | 184/55.2 |
| 2007/0031778 A1 * | 2/2007 | Helfenbein | A61B 90/70 |
| | | | 433/82 |
| 2010/0151415 A1 * | 6/2010 | Wiek | A61C 1/0084 |
| | | | 433/104 |
| 2011/0206555 A1 * | 8/2011 | Wiek | A61L 2/18 |
| | | | 422/109 |
| 2012/0301369 A1 * | 11/2012 | Heckenberger | A61C 19/002 |
| | | | 422/300 |
| 2019/0314535 A1 * | 10/2019 | Golkowski | A61L 2/208 |
| 2021/0023250 A1 * | 1/2021 | Golkowski | C01B 15/01 |
| 2023/0302170 A1 * | 9/2023 | Sarchi | A61L 2/10 |

FOREIGN PATENT DOCUMENTS

| | | |
|---|---|---|
| DE | 19913946 A1 | 9/2000 |
| KR | 102159329 B1 | 9/2020 |

\* cited by examiner

INVERSION MAINTENANCE DEVICE FOR DENTAL HANDPIECES

BACKGROUND OF THE INVENTION

1. Field of the Invention

The present invention relates to an inversion maintenance device for dental handpieces, especially to an inversion maintenance device for dental handpieces that is adapted to clean, disinfect, and maintain dental handpieces.

2. Description of the Prior Arts

A dental handpiece is a medical device commonly used in dental treatment. The dental handpiece is driven by electricity or high-pressure gas to rotate the drill to cut, turn, grind, trim or polish teeth. After the dental treatment is accomplished, the dental handpiece is cleaned first, followed by subsequent maintenance.

Conventionally, the dental handpiece is cleaned and maintained manually. In detail, an operator first sleeves a bag on the head of the dental handpiece, and then injects lubricating oil from the bottom of the dental handpiece, allowing the lubricating oil to infiltrate the bearing and the gear inside, and finally removes the excess lubricating oil by injecting gas. However, the manually cleaning and maintenance method can only deal one dental handpiece at a time, which takes lots of time to clean and maintain all dental handpieces and is inconvenient.

Therefore, with reference to FIG. 15, an automatic maintenance device for dental handpieces has been available on market. The automatic maintenance device for dental handpieces has a main body 90. The main body 90 has an adapting space 91, an outer cover 92, and multiple adapting bases 93. The adapting space 91 is formed on the main body 90 and has an opening facing forward. The outer cover 92 is pivotally mounted in the adapting space 91 and is capable of sealing the adapting space 91. The adapting bases 93 are mounted at a top of the adapting space 91. Each of the adapting bases 93 has an adapting port 931 facing downward. During maintenance, the operator connects the bottom of the dental handpiece 80 and the adapting port 931 of the adapting base 93 with the head of the dental handpiece 80 downward. Next, the operator turns the outer cover 92 to seal the adapting space 91. After then, the operator operates the automatic maintenance device to inject lubricating oil and gas to clean and maintain the dental handpiece 80.

However, since the adapting port 931 of the adapting base 93 faces downward, when the operator connects the dental handpiece 80 and the adapting port 931, the adapting port 931 is completely blocked by the main body from the operator's sight, such that the operator cannot directly see the adapting port 931 and needs to repeat aligning and connecting the dental handpiece 80 and the adapting port 931 without seeing them, which is inconvenient.

To overcome the shortcomings, the present invention provides an inversion maintenance device for dental handpieces to mitigate or obviate the aforementioned problems.

SUMMARY OF THE INVENTION

The main objective of the present invention is to provide an inversion maintenance device for dental handpieces to solve the inconvenience of connecting the dental handpiece and a conventional automatic maintenance device.

The inversion maintenance device for dental handpieces is adapted to clean, disinfect, and maintain at least one dental handpiece. The inversion maintenance device for dental handpieces has a case, an inverting mechanism, and a control system. The case forms an inversion space. The inverting mechanism has an inverting base and multiple adapting modules. The inverting base is pivotally mounted in the inversion space of the case. The adapting modules are mounted on the inverting base. Each of the adapting modules has an adapting port facing upward. The inverting base is capable of inverting to make the adapting port of the adapting modules face downward and cover the inversion space. The dental handpiece can be mounted on one of the adapting modules. The control system is mounted on the case and has a control module and an operation input terminal. The operation input terminal is connected to the control module via signals and is capable of controlling the control module to inject a working fluid with pressure into the dental handpiece via the adapting module to clean, disinfect, and maintain the dental handpiece.

The inversion maintenance device for dental handpieces of the present invention is adapted to clean, disinfect, and maintain dental handpieces. When a user mounts the dental handpiece, the adapting port of the adapting module faces upward for the user to directly see and align the bottom of the dental handpieces to the adapting port of the adapting module for installation. During maintenance of the dental handpiece, the inverting base is inverted to position the head of the dental handpiece mounted on the adapting module downward for the injection of the working fluid.

To sum up, the present invention is capable of changing the direction and the position of the adapting port of the adapting module by the inverting mechanism inverting the inverting base, so that the user is allowed to directly see the adapting port of the adapting module and to accurately align the dental handpiece to the adapting port for installation, thereby effectively improving the installation convenience of the dental handpiece without affecting the cleaning, disinfecting, and maintaining process of the dental handpiece.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
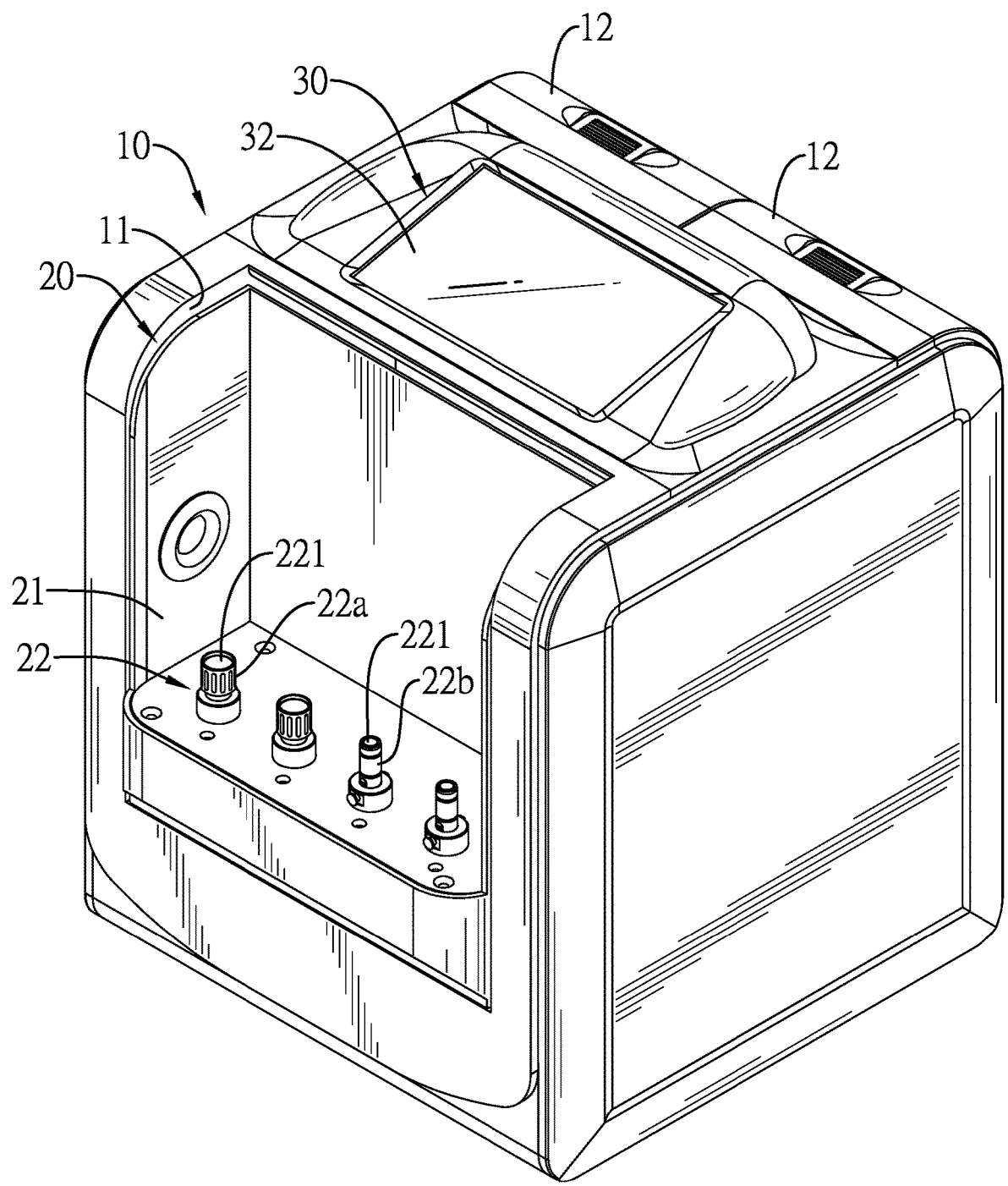
FIG. 1 is a perspective view of a first preferred embodiment of an inversion maintenance device for dental handpieces in accordance with the present invention.

With reference to FIGS. 1 to 6 and 13, a first preferred embodiment of an inversion maintenance device for dental handpieces in accordance with the present invention is adapted to clean, disinfect, and maintain dental handpieces 50a, 50b. The dental handpiece 50a, 50b comprise a high speed dental handpiece 50a and a low speed dental handpiece 50b, and the high speed dental handpiece 50a works with a higher rotation speed than the low speed dental handpiece 50b.

The inversion maintenance device for dental handpieces comprises a case 10, an inverting mechanism 20, and a control system 30.

Figure 3:
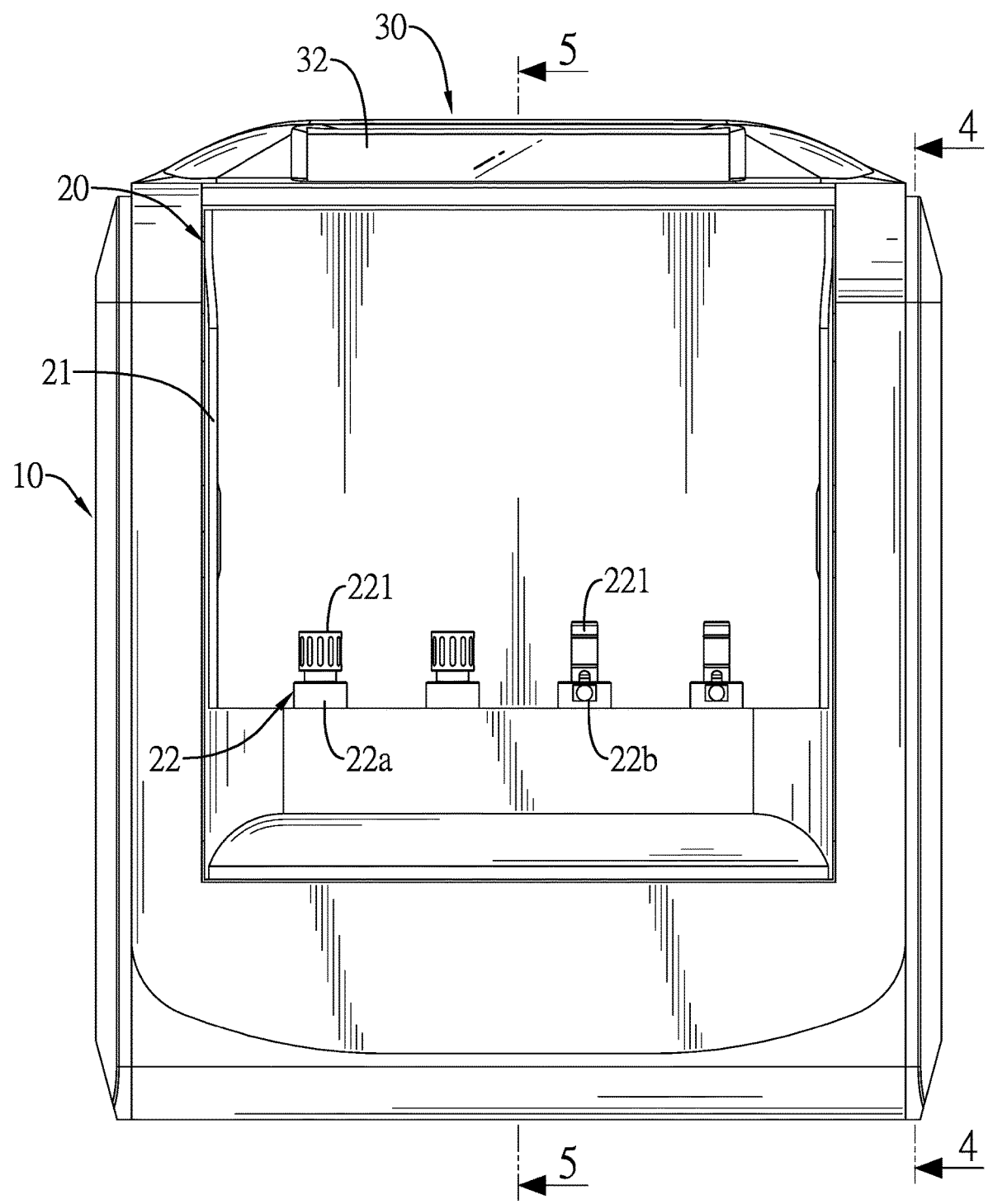
FIG. 3 is a front view of the first preferred embodiment of the inversion maintenance device for dental handpieces in FIG. 1.
Figure 5:
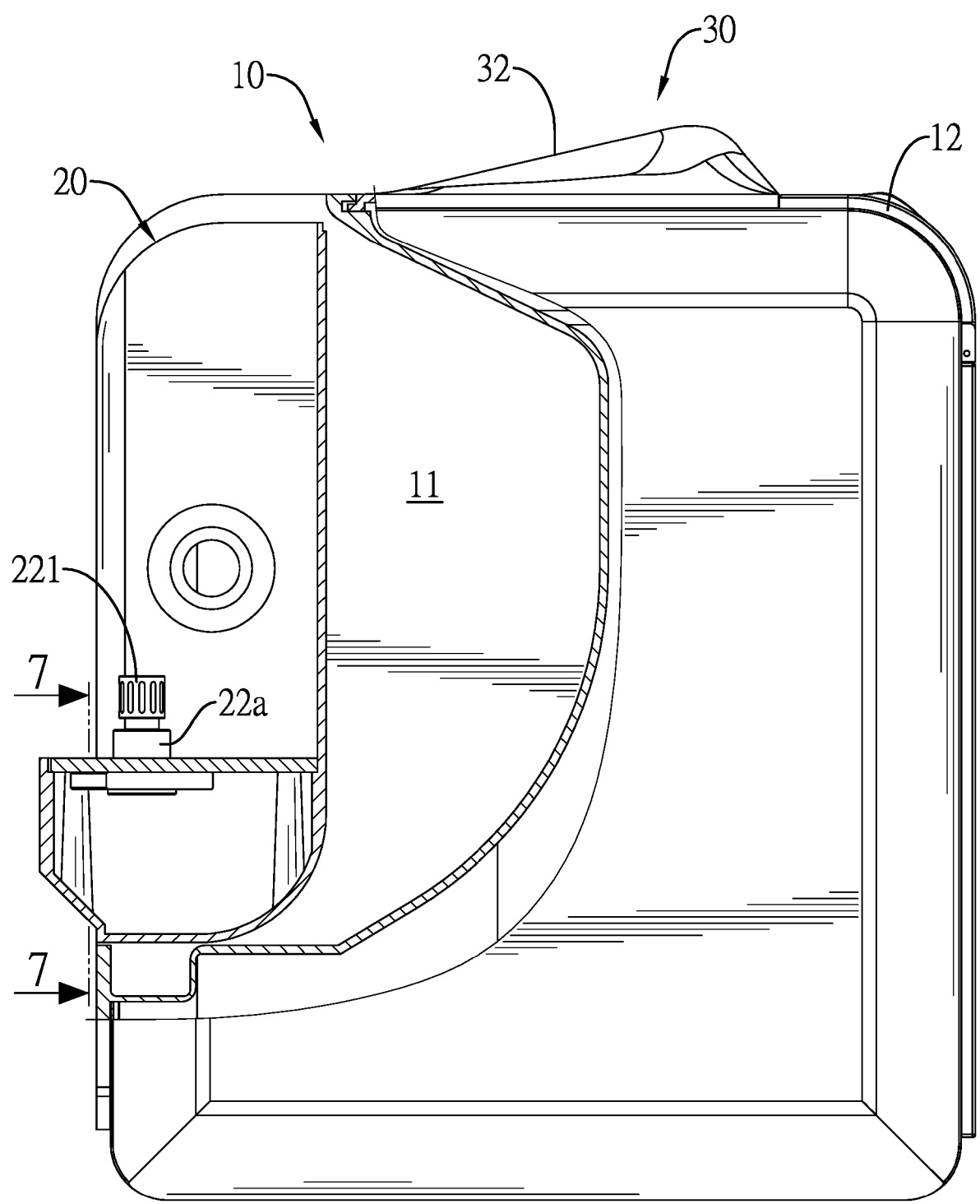
FIG. 5 is a partial side view in cross-section along the 5-5 cutting line in FIG. 3.

With reference to FIGS. 1, 3 and 5, the case 10 forms an inversion space 11.

With reference to FIGS. 1, 4, 10, 11 and 13, the inverting mechanism 20 has an inverting base 21 and multiple adapting modules 22. The inverting base 21 is pivotally mounted in the inversion space 11 of the case 10. Each of the adapting modules 22 is mounted on the inverting base 21 and has an adapting port facing upward. The inverting base is capable of inverting to make the adapting port of the adapting modules 22 face downward and cover the inversion space 11. The dental handpieces 50a, 50b can be mounted on one of the adapting modules 22.

The control system 30 is mounted on the case 10. The control system 30 has a control module 31 and an operation input terminal 32. The operation input terminal 32 is connected to the control module 31 via signals and is capable of controlling the control module 31 to inject a working fluid with pressure into the dental handpieces 50a, 50b via the adapting module 22 to clean, disinfect, and maintain the dental handpieces 50a, 50b. The operation input terminal 32 can be a control panel for on-site control or a remote operation interface for wireless control. For example, the operation input terminal for on-site control can be an operation panel having physical buttons or an operation panel having a touch screen, and the remote operation interface for wireless control allows a user to wirelessly connect and operate the control module 31 via a mobile device.

Additionally, the inversion maintenance device for dental handpieces is capable of cleaning, disinfecting, and maintaining dental handpieces 50a, 50b, and uses different kinds of working fluids for different processes. For cleaning, the working fluid can be cleaning fluid or neutralizing fluid. For disinfecting, the working fluid can be disinfectant. For maintenance, the working fluid can be lubricating oil.

Moreover, the working fluid can be supplied from a high pressure can containing the working fluid or a working fluid supplying source into the dental handpieces 50a, 50b via the adapting module 22 to clean, disinfect, and maintain, all processed by the control module 31 of the control system 30.

Alternatively, with reference to FIGS. 2, 5, 6, 9 and 12, in the first preferred embodiment, the inversion maintenance device for dental handpieces can also have at least one accommodating box 40 for accommodating the working fluid. Each of the at least one accommodating box 40 is mounted in the case 10 and has an injection port 41 extending to the case 10. The control system 30 has a fluid supplying module 33 and a gas supplying module 34. The fluid supplying module 33 is connected to the accommodating box 40 and multiple adapting modules 22. The gas supplying module 34 is connected to an external pressurized gas source and the adapting modules 22. The control module 31 is electrically connected to the fluid supplying module 33 and the gas supplying module 34, and is capable of controlling the fluid supplying module 33 and the gas supplying module 34 to supply working fluid and gas.

Figure 2:
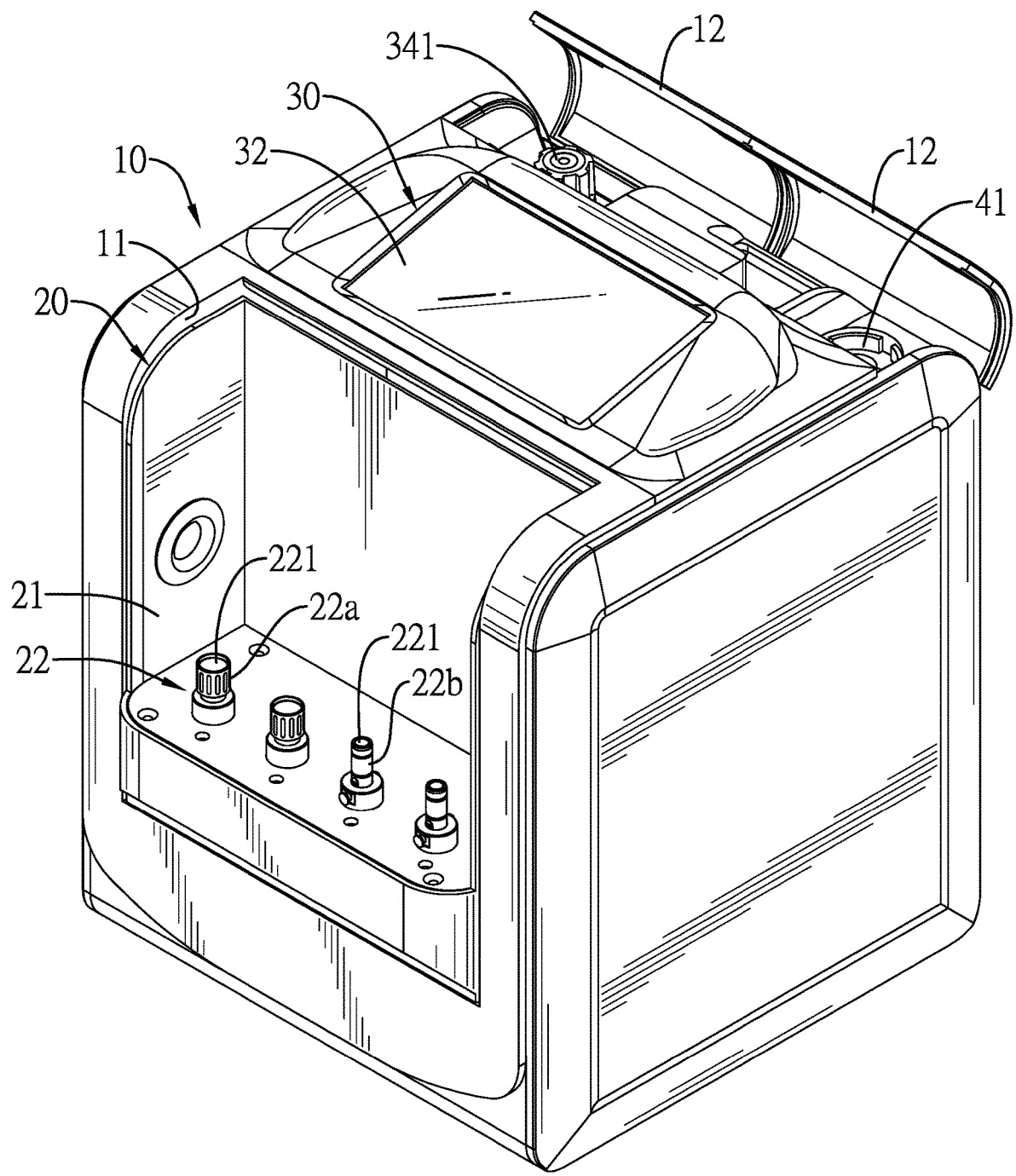
FIG. 2 is another perspective view of the first preferred embodiment of the inversion maintenance device for dental handpieces in FIG. 1, showing the outer cover opened.
Figure 6:
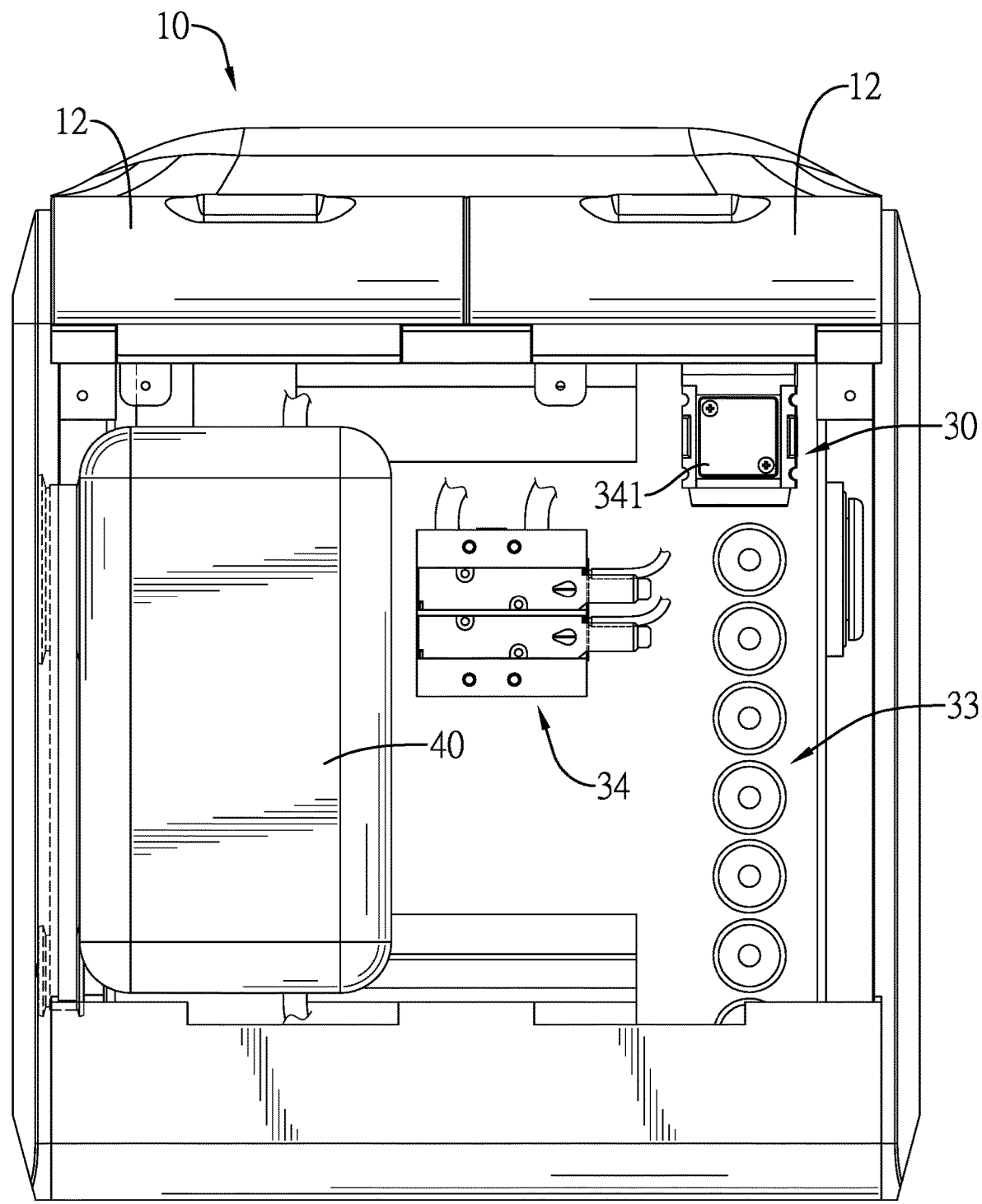
FIG. 6 is a back view of the first preferred embodiment of the inversion maintenance device for dental handpieces in FIG. 1, showing the configuration inside the case.

With reference to FIGS. 2 and 6, in the first preferred embodiment, the amount of the at least one accommodating box 40 is one. The accommodating box 40 is mounted in the case 10 and forms the injection port 41 extending to the case 10. The accommodating box 40 is capable of accommodating working fluid. The control module 31 controls the fluid supplying module 33 and the gas supplying module 34 to supply working fluid and gas.

Figure 8:
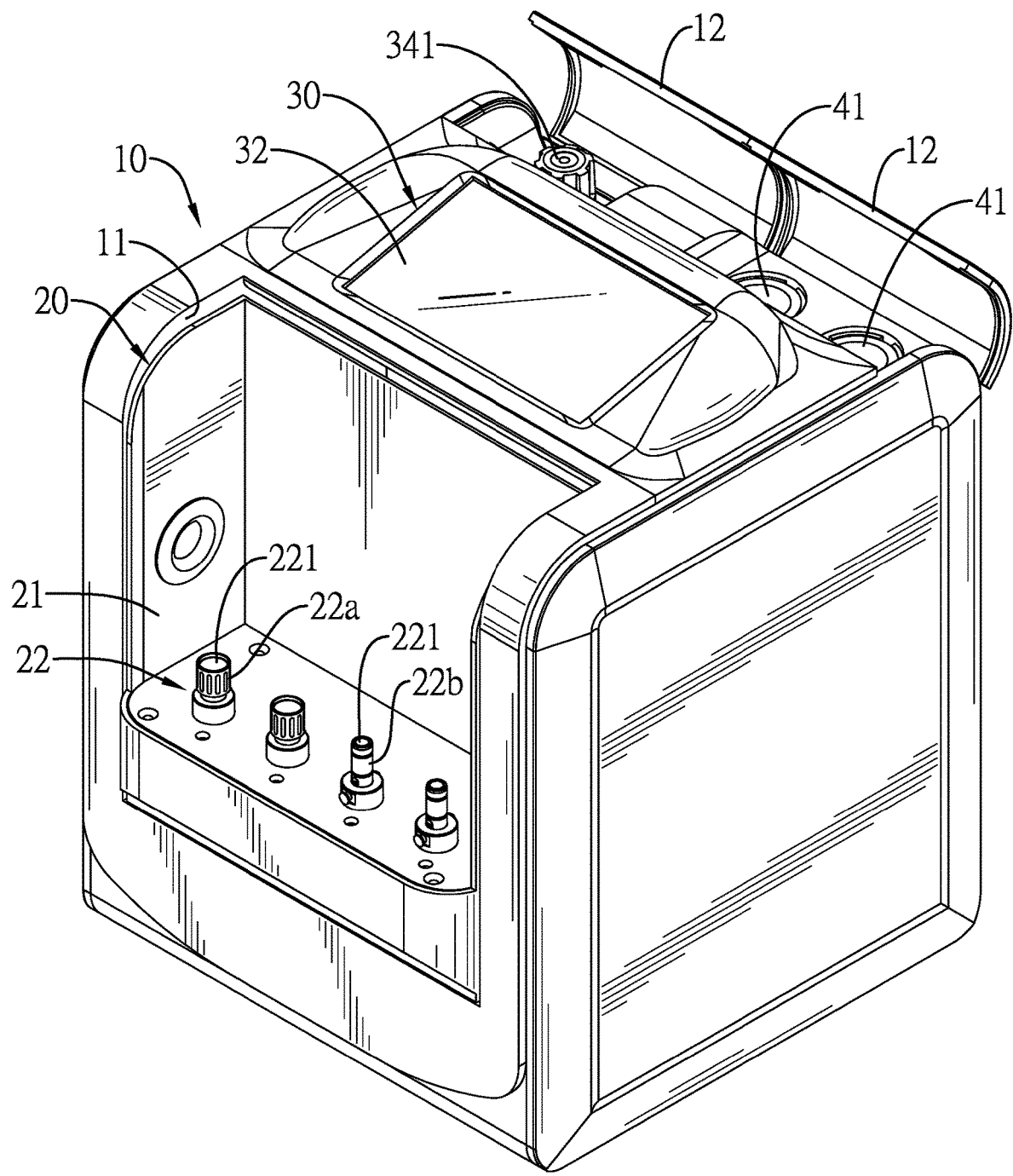
FIG. 8 is a perspective view of a second preferred embodiment of the inversion maintenance device for dental handpieces in accordance with the present invention, showing the outer cover opened.
Figure 9:
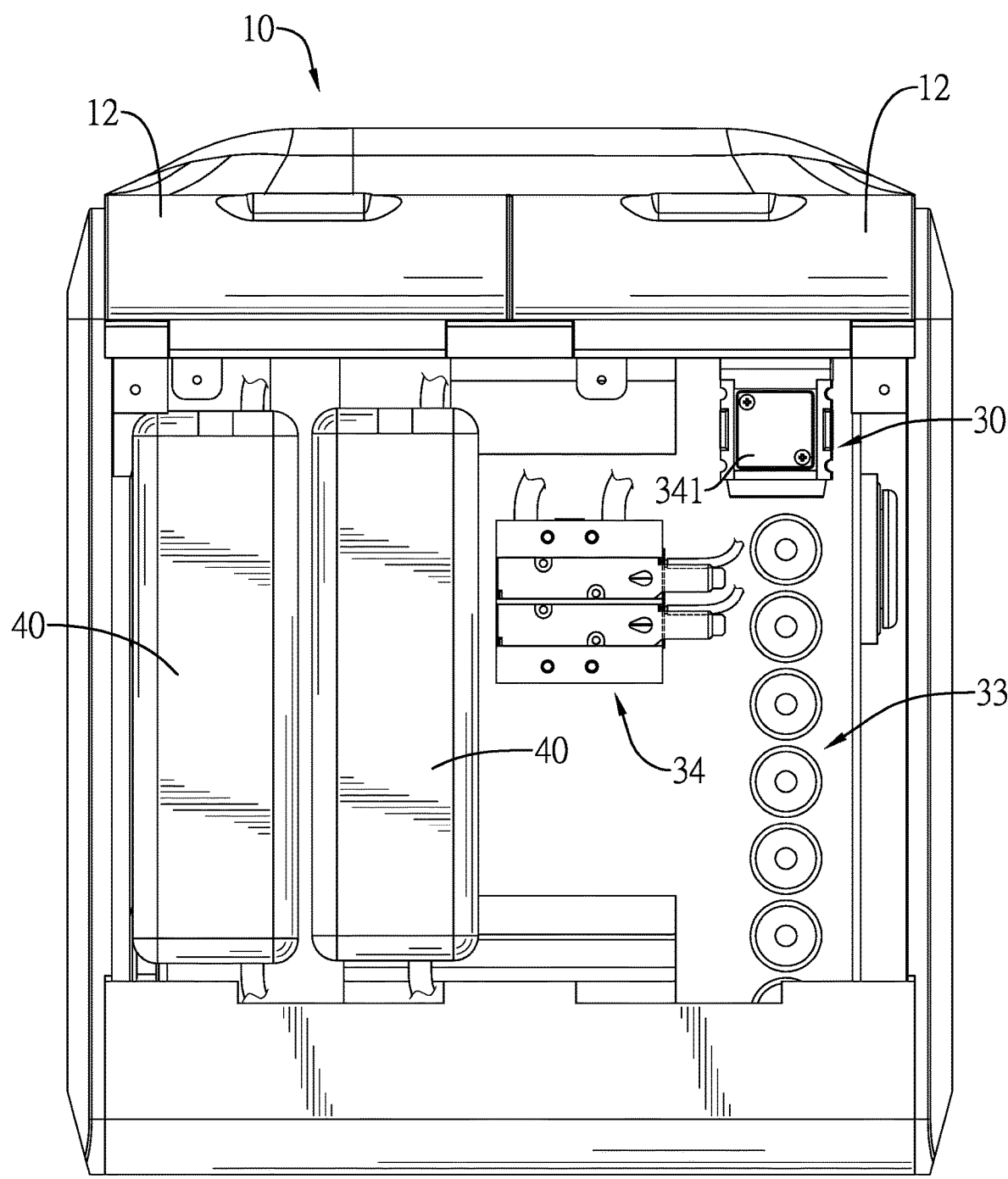
FIG. 9 is a back view of the second preferred embodiment of the inversion maintenance device for dental handpieces in FIG. 8, showing the configuration inside the case.
Figure 10:
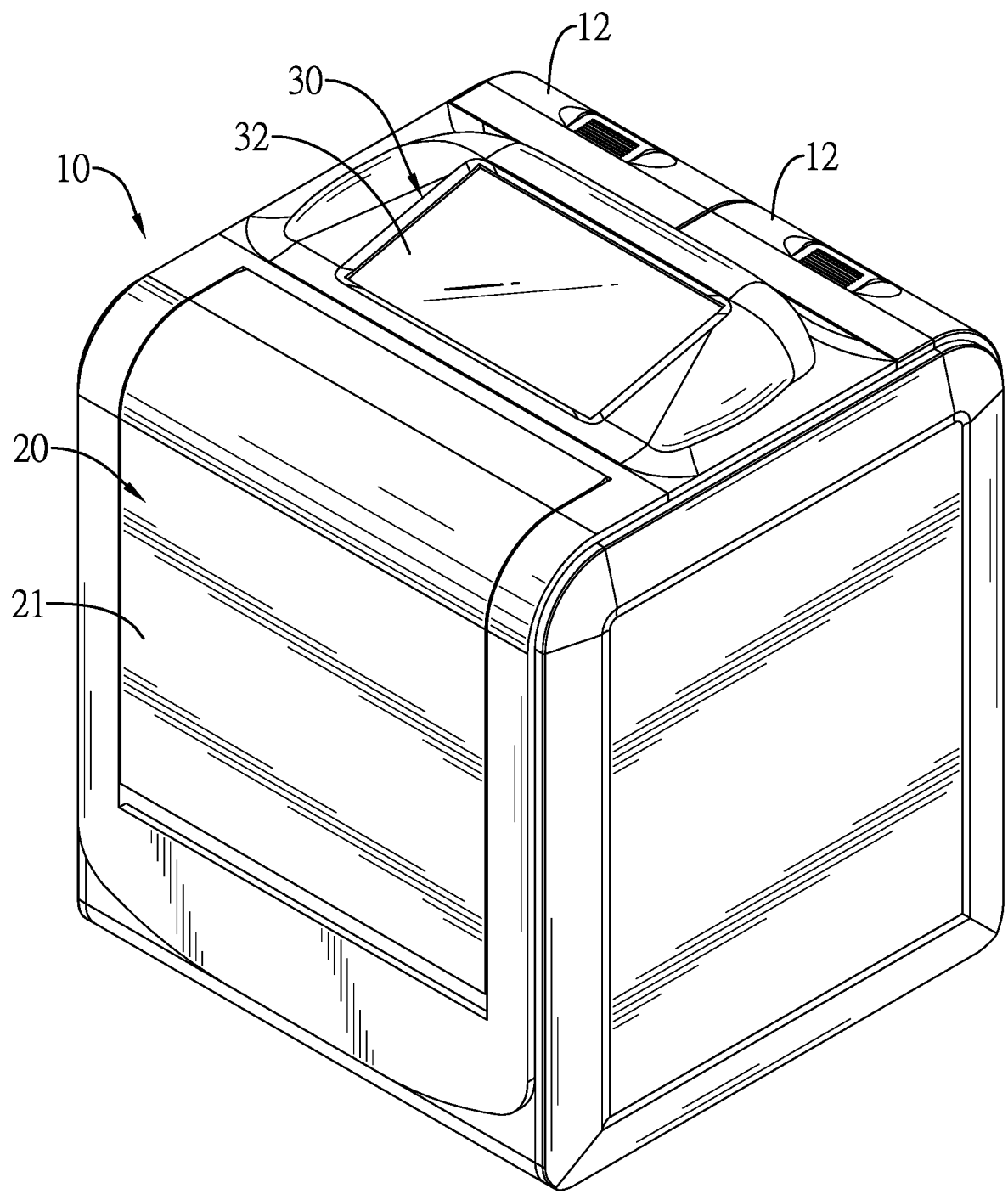
FIG. 10 is another perspective view of the first preferred embodiment of the inversion maintenance device for dental handpieces in FIG. 1, showing the inverting base inverted.
Figure 11:
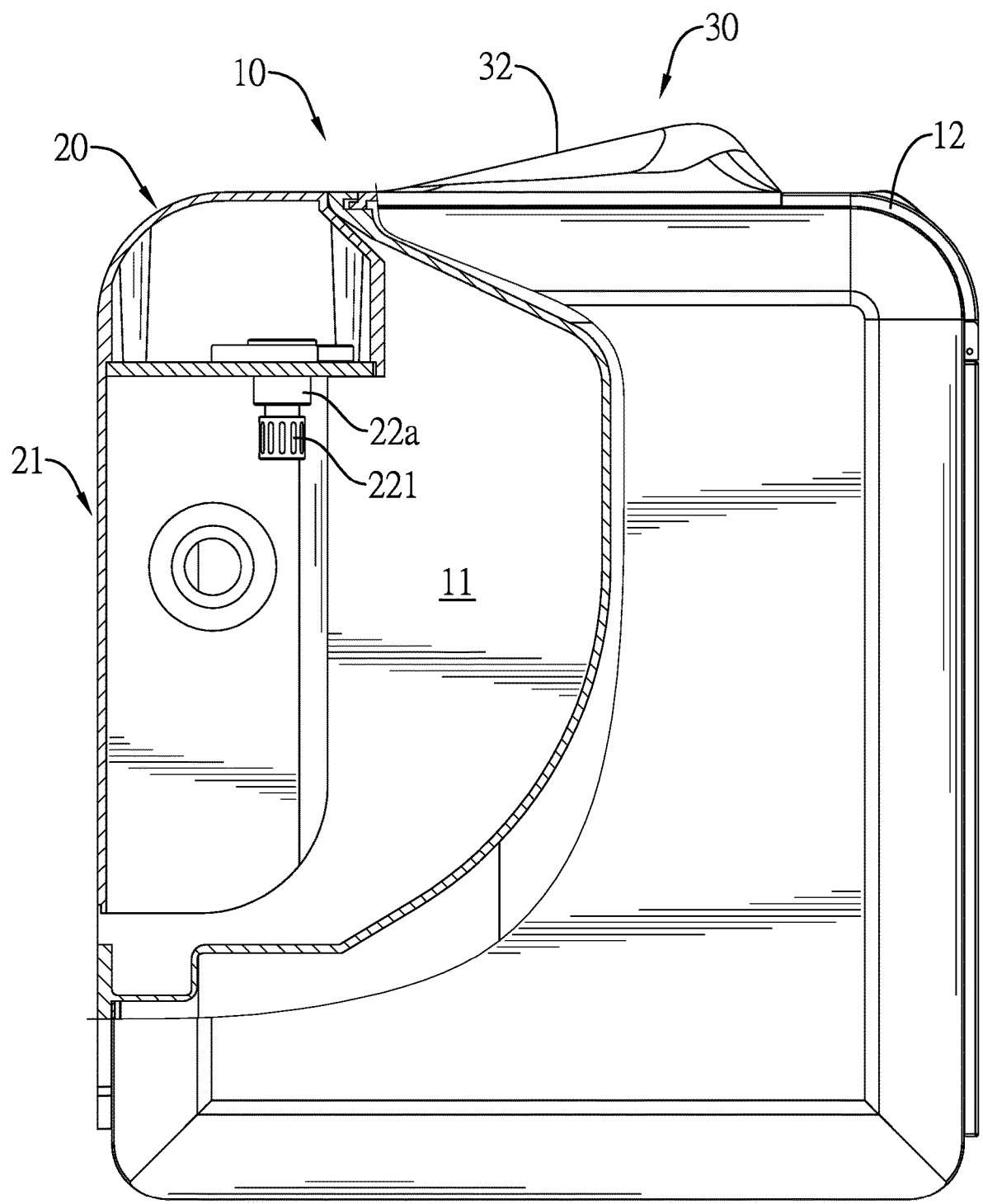
FIG. 11 is a side view in cross-section of the first preferred embodiment of the inversion maintenance device for dental handpieces in FIG. 10.

With reference to FIGS. 8 and 9, in a second preferred embodiment, the inversion maintenance device for dental handpieces has a plurality of the accommodating boxes 40. Each of the plurality of the accommodating boxes 40 has the injection port extending to the case 10. The accommodating boxes 40 accommodate different kinds of working fluids. The control module 31 controls the fluid supplying module 33 and the gas supplying module 34 to supply different kinds of working fluids and gases.

With reference to FIGS. 2 and 6, the gas supplying module 34 of the control system 30 has a pressure regulating valve 341. The pressure regulating valve 341 is connected to the gas supplying module 34 and is adapted to control a pressure of the gas supplied by the external pressurized gas source. The case 10 has two outer covers 12 respectively corresponding in position to the pressure regulating valve 341 and the injection port 41. The two outer covers 12 are pivotable and are capable of respectively covering the pressure regulating valve 341 and the injection port 41.

Figure 12:
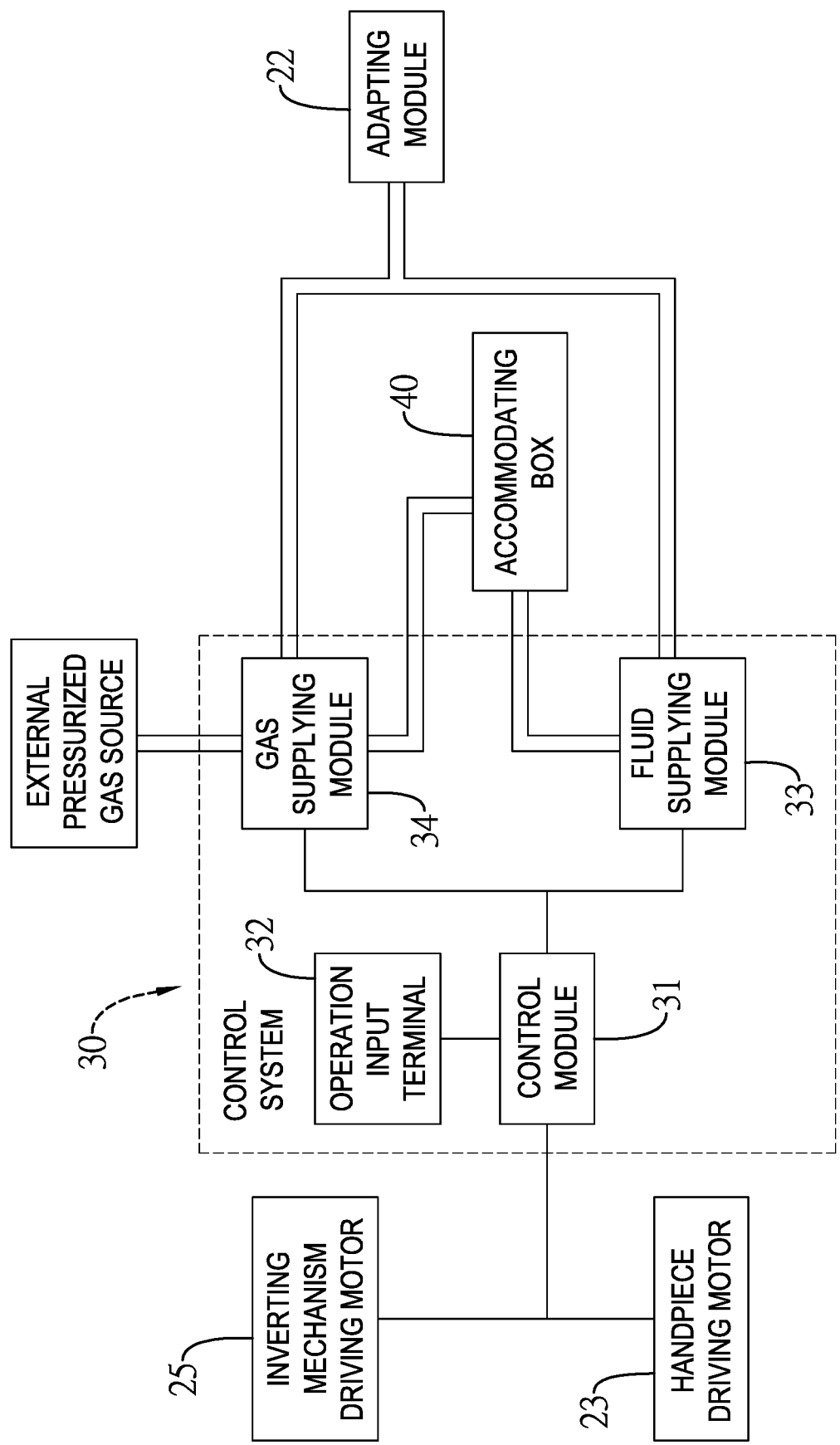
FIG. 12 is a circuit block diagram of the first preferred embodiment of the inversion maintenance device for dental handpieces in FIG. 1.

With reference to FIG. 12, the gas supplying module 34 is connected to the accommodating box 40. The control module 31 is capable of controlling the gas supplying module 34 to supply pressurized gas into the accommodating box 40 or controlling the gas supplying module 34 to supply pressurized gas to the adapting modules 22. The gas supplying module 34 is capable of supplying pressurized gas into the accommodating box 40 to push the working fluid inside so that the working fluid inside can be supplied to the fluid supplying module 33.

Figure 7:
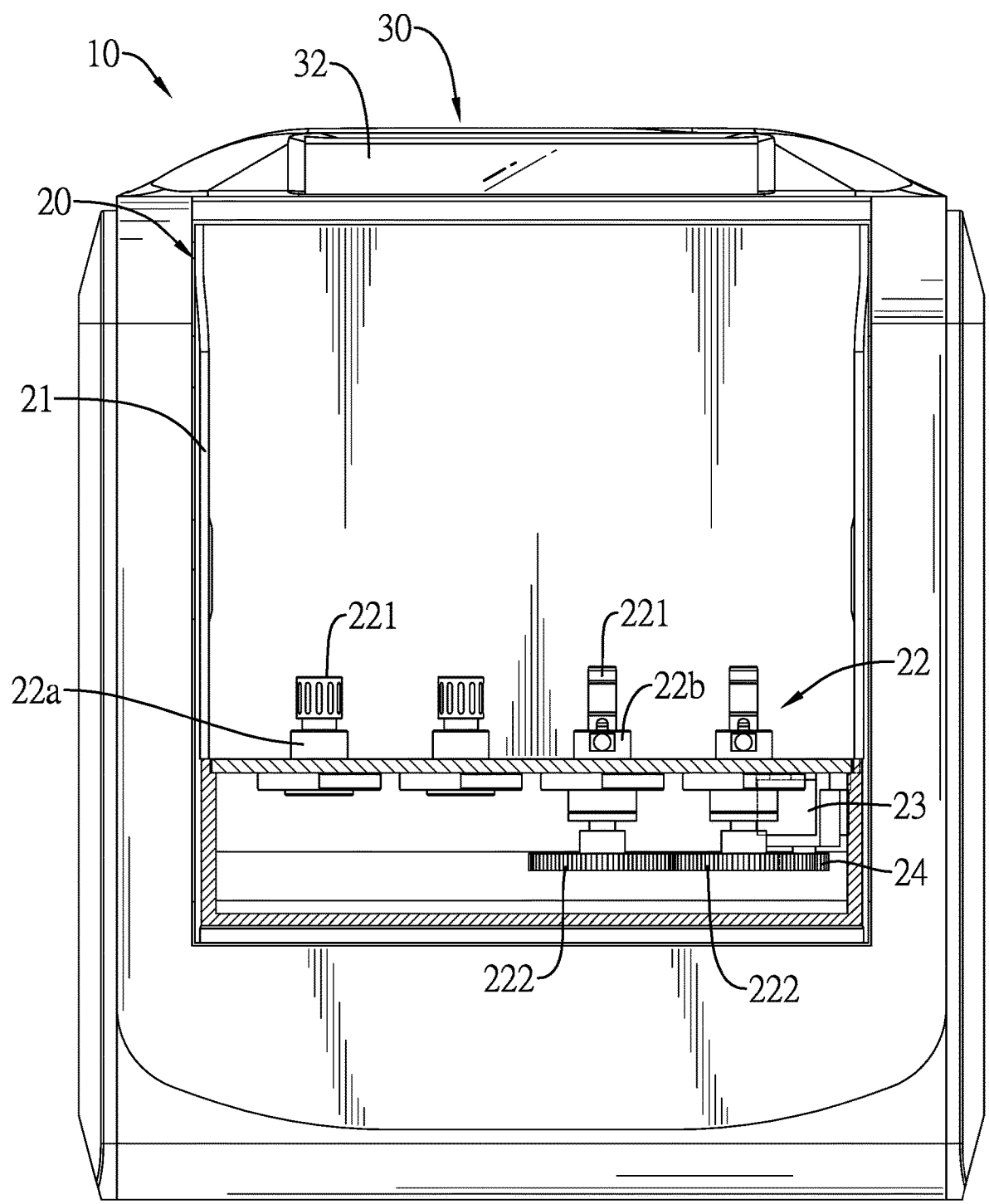
FIG. 7 is a front view in cross-section along the 7-7 cutting line in FIG. 5.

With reference to FIGS. 7 and 12, the inverting mechanism 20 has a handpiece driving motor 23 and a driving wheel 24 connected to the handpiece driving motor 23. The handpiece driving motor 23 is mounted on the inverting base 21. The adapting modules 22 comprising multiple high speed handpiece adapting modules 22*a* and multiple low speed handpiece adapting modules 22*b*. Each of the low speed handpiece adapting modules 22*b* has a driven wheel 222. The driven wheels 222 of the low speed handpiece adapting modules 22*b* engage with each other. The driving wheel 24 engages with one of the driven wheels 222. The handpiece driving motor 23 is electrically connected to and is controlled by the control module 31.

With reference to FIG. 7, the low speed handpiece adapting modules 22*b* are driven by the driving wheel 24 of the handpiece driving motor 23 via the driven wheels 222 engaging with the driving wheel 24. When the manufacturer needs to add another low speed handpiece adapting module 22*b*, the manufacturer only needs to engage the driven wheel 222 of the added low speed handpiece adapting module 22*b* with the adjacent driven wheel 222, and then the low speed handpiece adapting module 22*b* can be added. Therefore, the manufacturer can set the inversion maintenance device for dental handpieces and configure appropriate amounts of the high speed handpiece adapting modules 22*a* and the low speed handpiece adapting module 22*b* depending on practices in different districts or user's requirement of high speed dental handpieces 50*a* and low speed dental handpieces 50*b*, and therefore the quantity of the high speed handpiece adapting modules 22*a* and the low speed handpiece adapting modules 22*b* can be customized.

Figure 4:
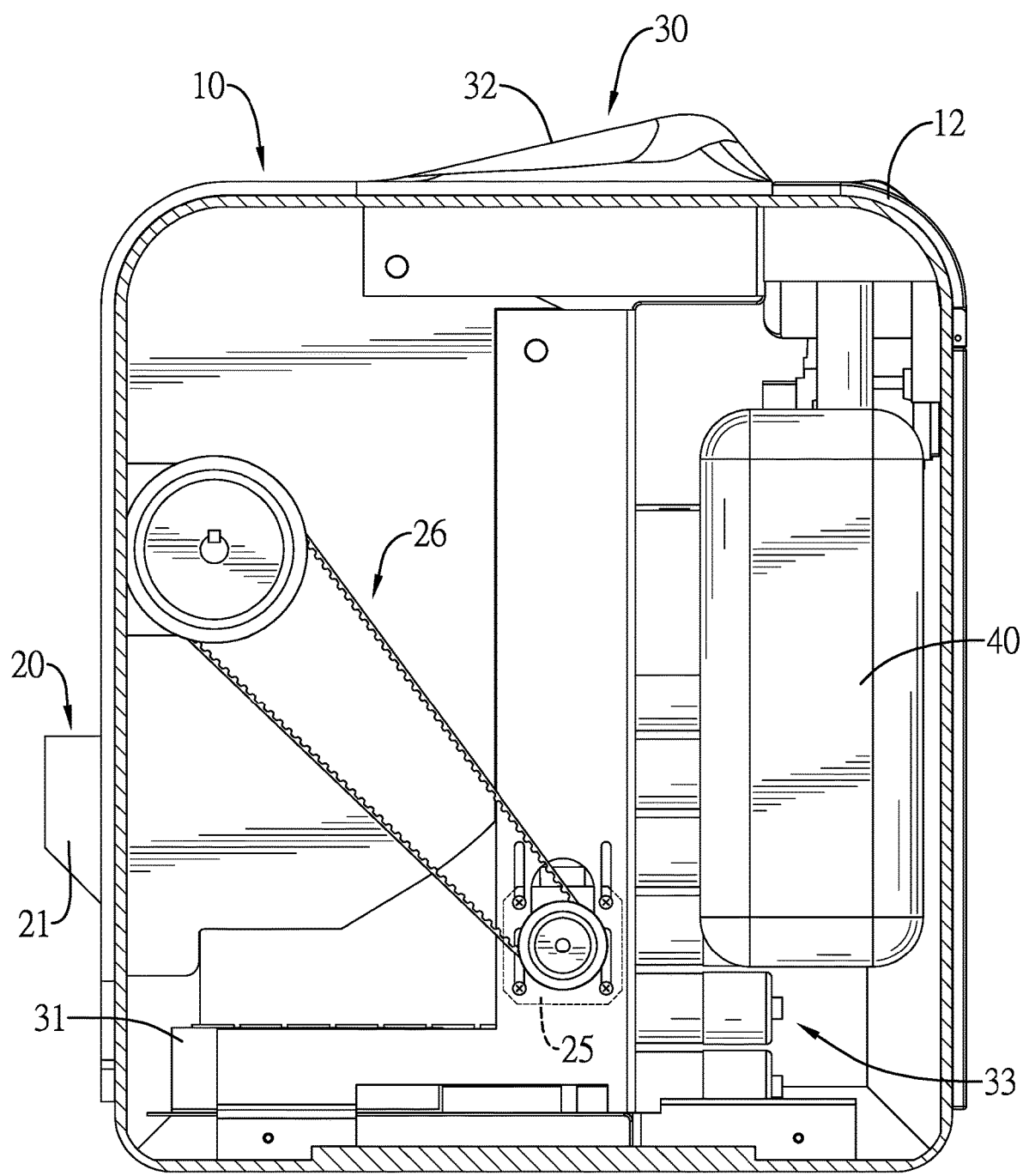
FIG. 4 is a partial side view in cross-section along the 4-4 cutting line in FIG. 3.

Additionally, with reference to FIGS. 4 and 12, the inverting base 21 of the inverting mechanism 20 can be inverted manually. Alternatively, the inverting mechanism 20 can also have an inverting mechanism driving motor 25 and a transmission assembly 26. The inverting mechanism driving motor 25 is mounted in the case 10. The transmission assembly 26 is connected to the inverting mechanism driving motor 25 and the inverting base 21. The inverting mechanism driving motor 25 is capable of inverting the inverting base 21 via the transmission assembly 26. The inverting mechanism driving motor 25 is electrically connected to and controlled by the control module 31, so that the inverting mechanism 20 can control the inverting base 21 to invert via the control module 31.

Figure 13:
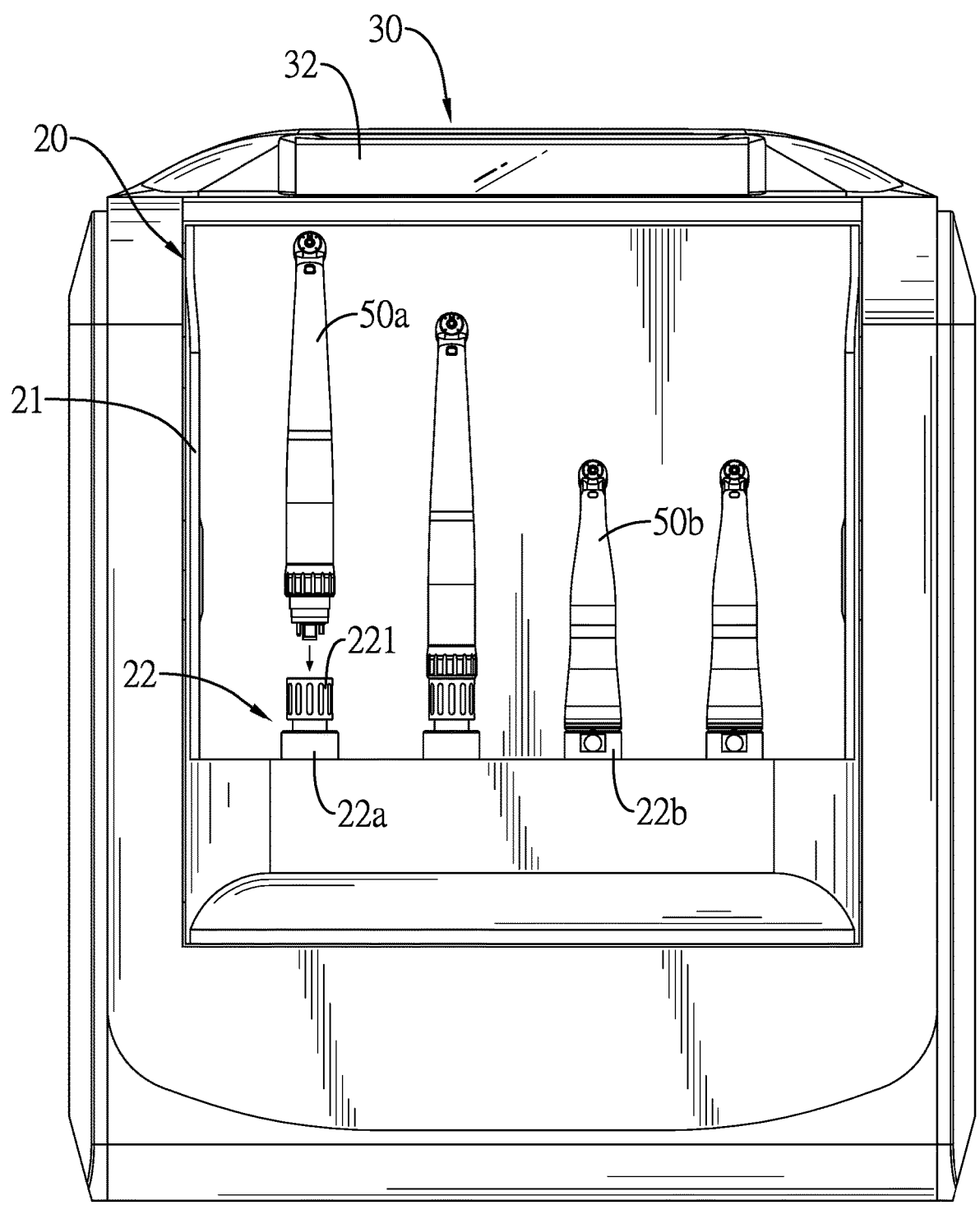
FIG. 13 is a front view of the first preferred embodiment of the inversion maintenance device for dental handpieces in FIG. 1, showing operations of installing the dental handpieces.

In the first preferred embodiment, with reference to FIGS. 12 and 13, the inversion maintenance device for dental handpieces of the present invention allows the user to mount the dental handpieces 50*a*, 50*b* on the adapting modules 22 and then control the gas supplying module 34 and the fluid supplying module 33 to supply working fluid and gas via the operation input terminal 32 of the control system 30.

With reference to FIG. 2, before the user mounts the dental handpieces 50*a*, 50*b*, the user connects the external pressurized gas source to the gas supplying module 34, and the user opens the outer cover 12 of the case 10 to inject working fluid into the accommodating box 40 via the injection port 41. The user operates the pressure regulating valve 341 to adjust the pressure of the gas from the external pressurized gas source.

With reference to FIG. 13, when installing the dental handpieces 50*a*, 50*b*, the user mounts the high speed dental handpiece 50*a* on the adapting port 221 of the high speed handpiece adapting module 22*a*, and mounts the low speed dental handpiece 50*b* on the adapting port 221 of the low speed handpiece adapting module 22*b*. Herein, since the inverting base 21 of the inverting mechanism 20 is not inverted and the adapting ports 221 of the adapting modules 22 are all upward, when installing the dental handpieces 50*a*, 50*b*, the user is allowed to hold the dental handpieces 50*a*, 50*b* with the head upward and align the bottom of the dental handpieces 50*a*, 50*b* to the adapting port 221 of the corresponding adapting module 22 with a clear view of the adapting port 221, which effectively improves the convenience of installing the dental handpieces 50*a*, 50*b*.

Figure 14:
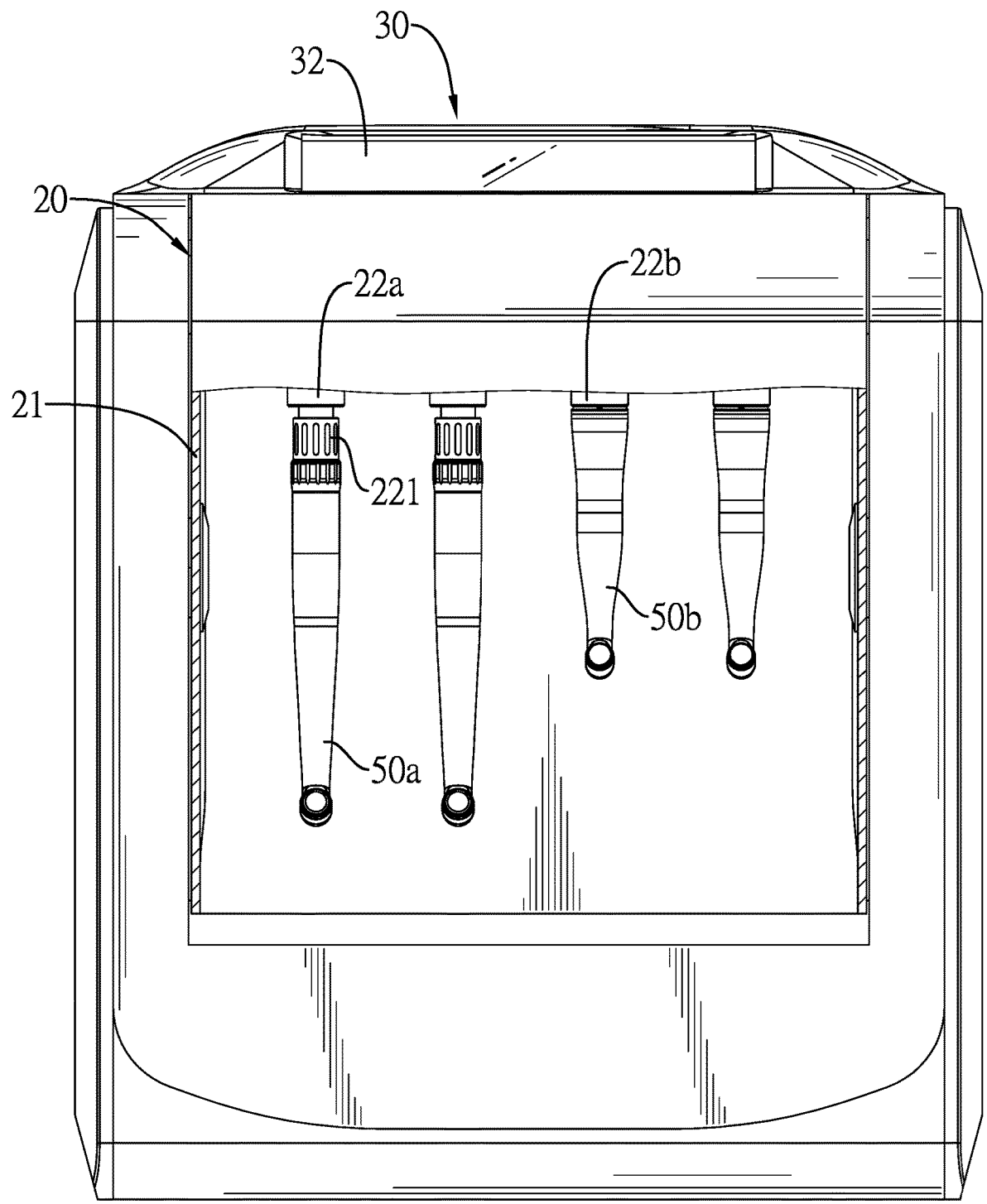
FIG. 14 is a front view in cross-section of the first preferred embodiment of the inversion maintenance device for dental handpieces in FIG. 5.
Figure 15:
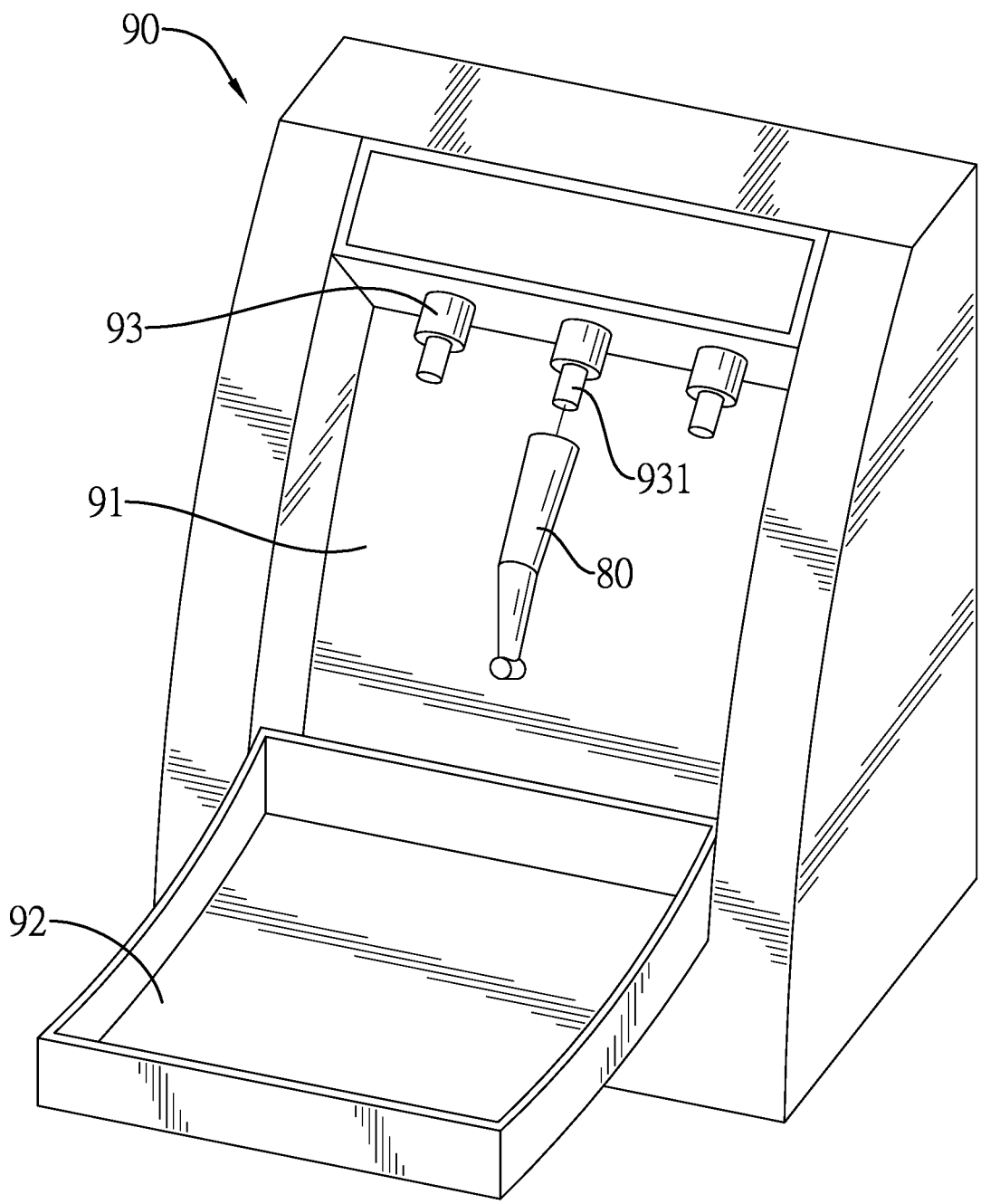
FIG. 15 is a perspective view of a conventional automatic maintenance device for dental handpieces.

With reference to FIGS. 4 and 14, the user can control the inverting mechanism driving motor 25 and the transmission assembly 26 of the inverting mechanism 20 to invert the inverting base 21 by operating the operation input terminal 32. The inverting base 21 will be inverted and cover the inversion space 11, and the dental handpieces 50*a*, 50*b* in the inversion space 11 will be set with the head downward.

With reference to FIGS. 12 and 14, the control module 31 controls the gas supplying module 34 to supply pressurized gas into the accommodating box 40 to make the working fluid inside flow into the dental handpieces 50*a*, 50*b* sequentially via the fluid supplying module 33 and the adapting modules 22. After then, the control module 31 controls the gas supplying module 34 to supply pressurized gas into the dental handpieces 50*a*, 50*b* via the adapting modules 22 to drain the excess working fluid inside the dental handpieces 50*a*, 50*b*.

With reference to FIGS. 7, 12 and 14, during the injection of the working fluid into the dental handpieces 50*a*, 50*b*, the control module 31 controls the gas supplying module 34 to supply gas to the high speed handpiece adapting module 22*a* to drive the high speed dental handpiece 50*a*, and controls the handpiece driving motor 23 to drive the low speed dental handpiece 50*b* via the driven wheel 222 of the low speed handpiece adapting module 22*b*, so the working fluid injected into the dental handpieces 50*a*, 50*b* completely infiltrates the internal mechanism of the dental handpieces 50*a*, 50*b* to ensure the effect of cleaning, disinfecting, and maintenance.

To sum up, the inversion maintenance device for dental handpieces of the present invention is capable of changing the direction and the position of the adapting port 221 of the adapting module 22 by the inverting mechanism 20 inverting the inverting base 21, so that the user is allowed to directly see the adapting port 221 of the adapting module 22 and to accurately align the dental handpiece to the adapting port 221 to install, thereby effectively improving the installation convenience of the dental handpiece without affecting the cleaning, disinfecting, and maintaining processes of the dental handpiece.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An inversion maintenance device for dental handpieces; the inversion maintenance device adapted to clean, disinfect, and maintain at least one dental handpiece; the inversion maintenance device comprising:
    a case forming an inversion space;
    an inverting mechanism having
        an inverting base pivotally mounted in the inversion space of the case; and multiple adapting modules mounted on the inverting base; each of the adapting modules having
an adapting port facing upward; the inverting base being capable of inverting to make the adapting port of the adapting modules face downward and to cover the inversion space; each of the at least one dental handpiece adapted to be mounted on one of the adapting modules; and
a control system mounted on the case and having
a control module; and
an operation input terminal connected to the control module via signals and being capable of controlling the control module to inject a working fluid with pressure into the at least one dental handpiece via the adapting module to clean, disinfect, and maintain the at least one dental handpiece.

2. The inversion maintenance device for dental handpieces as claimed in claim 1, wherein
the inverting mechanism has
a handpiece driving motor mounted on the inverting base, electrically connected to the control module, and controlled by the control module;
a driving wheel connected to the handpiece driving motor;
the adapting modules comprising
multiple high speed handpiece adapting modules;
multiple low speed handpiece adapting modules; each of the low speed handpiece adapting modules having a driven wheel; the driven wheels of the low speed handpiece adapting modules engaging with each other; the driving wheel engaging with the driven wheel of one of the low speed handpiece adapting modules.

3. The inversion maintenance device for dental handpieces as claimed in claim 1, wherein
the inverting mechanism has
an inverting mechanism driving motor mounted in the case, electrically connected to the control module, and controlled by the control module;
a transmission assembly connected to the inverting mechanism driving motor and the inverting base; the inverting mechanism driving motor being capable of inverting the inverting base via the transmission assembly.

4. The inversion maintenance device for dental handpieces as claimed in claim 2, wherein
the inverting mechanism has
an inverting mechanism driving motor mounted in the case, electrically connected to the control module, and controlled by the control module;
a transmission assembly connected to the inverting mechanism driving motor and the inverting base; the inverting mechanism driving motor being capable of inverting the inverting base via the transmission assembly.

5. The inversion maintenance device for dental handpieces as claimed in claim 1, wherein
the inversion maintenance device has
at least one accommodating box mounted in the case, adapted to accommodate the working fluid, and having
an injection port extending to the case;
the control system has
a fluid supplying module connected to the at least one accommodating box and the adapting modules;
a gas supplying module connected to an external pressurized gas source and the adapting modules;
the control module is electrically connected to the fluid supplying module and the gas supplying module and is capable of controlling the fluid supplying module and the gas supplying module to supply the working fluid and gas to the adapting modules.

6. The inversion maintenance device for dental handpieces as claimed in claim 2, wherein
the inversion maintenance device has
at least one accommodating box mounted in the case, adapted to accommodate the working fluid, and having
an injection port extending to the case;
the control system has
a fluid supplying module connected to the at least one accommodating box and the adapting modules;
a gas supplying module connected to an external pressurized gas source and the adapting modules;
the control module is electrically connected to the fluid supplying module and the gas supplying module and is capable of controlling the fluid supplying module and the gas supplying module to supply the working fluid and gas to the adapting modules.

7. The inversion maintenance device for dental handpieces as claimed in claim 3, wherein
the inversion maintenance device has
at least one accommodating box mounted in the case, adapted to accommodate the working fluid, and having
an injection port extending to the case;
the control system has
a fluid supplying module connected to the at least one accommodating box and the adapting modules;
a gas supplying module connected to an external pressurized gas source and the adapting modules;
the control module is electrically connected to the fluid supplying module and the gas supplying module and is capable of controlling the fluid supplying module and the gas supplying module to supply the working fluid and gas to the adapting modules.

8. The inversion maintenance device for dental handpieces as claimed in claim 4, wherein
the inversion maintenance device has
at least one accommodating box mounted in the case, adapted to accommodate the working fluid, and having
an injection port extending to the case;
the control system has
a fluid supplying module connected to the at least one accommodating box and the adapting modules;
a gas supplying module connected to an external pressurized gas source and the adapting modules;
the control module is electrically connected to the fluid supplying module and the gas supplying module and is capable of controlling the fluid supplying module and the gas supplying module to supply the working fluid and gas to the adapting modules.

9. The inversion maintenance device for dental handpieces as claimed in claim 5, wherein
the gas supplying module has
a pressure regulating valve adapted to control a pressure of the gas supplied by the external pressurized gas source.

10. The inversion maintenance device for dental handpieces as claimed in claim 6, wherein
the gas supplying module has a pressure regulating valve adapted to control a pressure of the gas supplied by the external pressurized gas source.

11. The inversion maintenance device for dental handpieces as claimed in claim 7, wherein
the gas supplying module has
a pressure regulating valve adapted to control a pressure of the gas supplied by the external pressurized gas source.

12. The inversion maintenance device for dental handpieces as claimed in claim 8, wherein
the gas supplying module has
a pressure regulating valve adapted to control a pressure of the gas supplied by the external pressurized gas source.

13. The inversion maintenance device for dental handpieces as claimed in claim 5, wherein
the gas supplying module is connected to the at least one accommodating box;
the control module is capable of controlling the gas supplying module to supply pressurized gas into the at least one accommodating box or controlling the gas supplying module to supply pressurized gas to the adapting modules.

14. The inversion maintenance device for dental handpieces as claimed in claim 6, wherein
the gas supplying module is connected to the at least one accommodating box;
the control module is capable of controlling the gas supplying module to supply pressurized gas into the at least one accommodating box or controlling the gas supplying module to supply pressurized gas to the adapting modules.

15. The inversion maintenance device for dental handpieces as claimed in claim 7, wherein
the gas supplying module is connected to the at least one accommodating box;
the control module is capable of controlling the gas supplying module to supply pressurized gas into the at least one accommodating box or controlling the gas supplying module to supply pressurized gas to the adapting modules.

16. The inversion maintenance device for dental handpieces as claimed in claim 8, wherein
the gas supplying module is connected to the at least one accommodating box;
the control module is capable of controlling the gas supplying module to supply pressurized gas into the at least one accommodating box or controlling the gas supplying module to supply pressurized gas to the adapting modules.

17. The inversion maintenance device for dental handpieces as claimed in claim 1, wherein
the operation input terminal is a control panel for on-site control or a remote operation interface for wireless control.

18. The inversion maintenance device for dental handpieces as claimed in claim 2, wherein
the operation input terminal is a control panel for on-site control or a remote operation interface for wireless control.

19. The inversion maintenance device for dental handpieces as claimed in claim 3, wherein
the operation input terminal is a control panel for on-site control or a remote operation interface for wireless control.

20. The inversion maintenance device for dental handpieces as claimed in claim 4, wherein
the operation input terminal is a control panel for on-site control or a remote operation interface for wireless control.

* * * * *